United States Patent [19]

Mackal et al.

[11] 4,305,425
[45] Dec. 15, 1981

[54] ORAL INFLATION VALVE

[76] Inventors: Glenn H. Mackal, Buena Vista Dr., Ringwood, N.J. 07456; James H. Keller, 254 Knoll Dr., Park Ridge, N.J. 07656

[21] Appl. No.: 171,319

[22] Filed: Jul. 23, 1980

Related U.S. Application Data

[63] Continuation of Ser. No. 916,499, Jun. 19, 1978, abandoned.

[51] Int. Cl.$^3$ ............................................. F16K 15/06
[52] U.S. Cl. ................................ 137/541; 137/543.17
[58] Field of Search ................... 137/541, 543.17, 223; 251/339

[56] References Cited

U.S. PATENT DOCUMENTS

| | | | |
|---|---|---|---|
| 1,781,681 | 11/1930 | Cooke | 137/541 X |
| 2,608,210 | 8/1952 | St. Clair | 137/541 |
| 3,001,546 | 9/1961 | Salisbury | 137/541 |
| 3,351,081 | 11/1967 | Bogossian et al. | 137/223 |
| 3,396,743 | 8/1968 | Mackal et al. | 137/541 |
| 3,590,851 | 7/1971 | Bogossian et al. | 137/541 |
| 3,800,824 | 4/1974 | Medina | 137/541 |
| 3,878,861 | 4/1975 | Pareja | 137/543.17 |
| 4,129,145 | 12/1978 | Wynn | 137/541 |

*Primary Examiner*—William R. Cline

[57] ABSTRACT

There is disclosed an improved check valve for operation under light pressure, as in the oral inflation of inflatable articles. The valve has a valve body and a valve element reciprocable therein, the valve element having a body which carries an annular sealing means cooperating with and selectively sealing an axially outwardly converging valve seat having the shape of part of a sphere. The valve body and the valve element are substantially shorter than those of the prior art over which it is an improvement; the means for guiding the forward or outer end of the valve element remote from the valve seat and the sealing means has pronounced clearance with respect to the axial passage through the valve body, thereby permitting appreciable tipping of the valve element relative to the valve body, the sealing means effecting a seal with the valve seat in any position of the valve element in which it may be tipped relative to the valve body. The seat for the axially inner end of the coil compression spring which urges the valve element toward valve-closed position is formed by a plurality of circumferentially thin radially projecting fingers which provide a much larger effective area of flow of fluid through the valve than the formerly employed continuous annular flange. The valve seat on the valve body is partially isolated from the body proper of the valve, so that distortion of the valve seat by pressure applied to the valve outwardly thereof is minimized.

3 Claims, 5 Drawing Figures

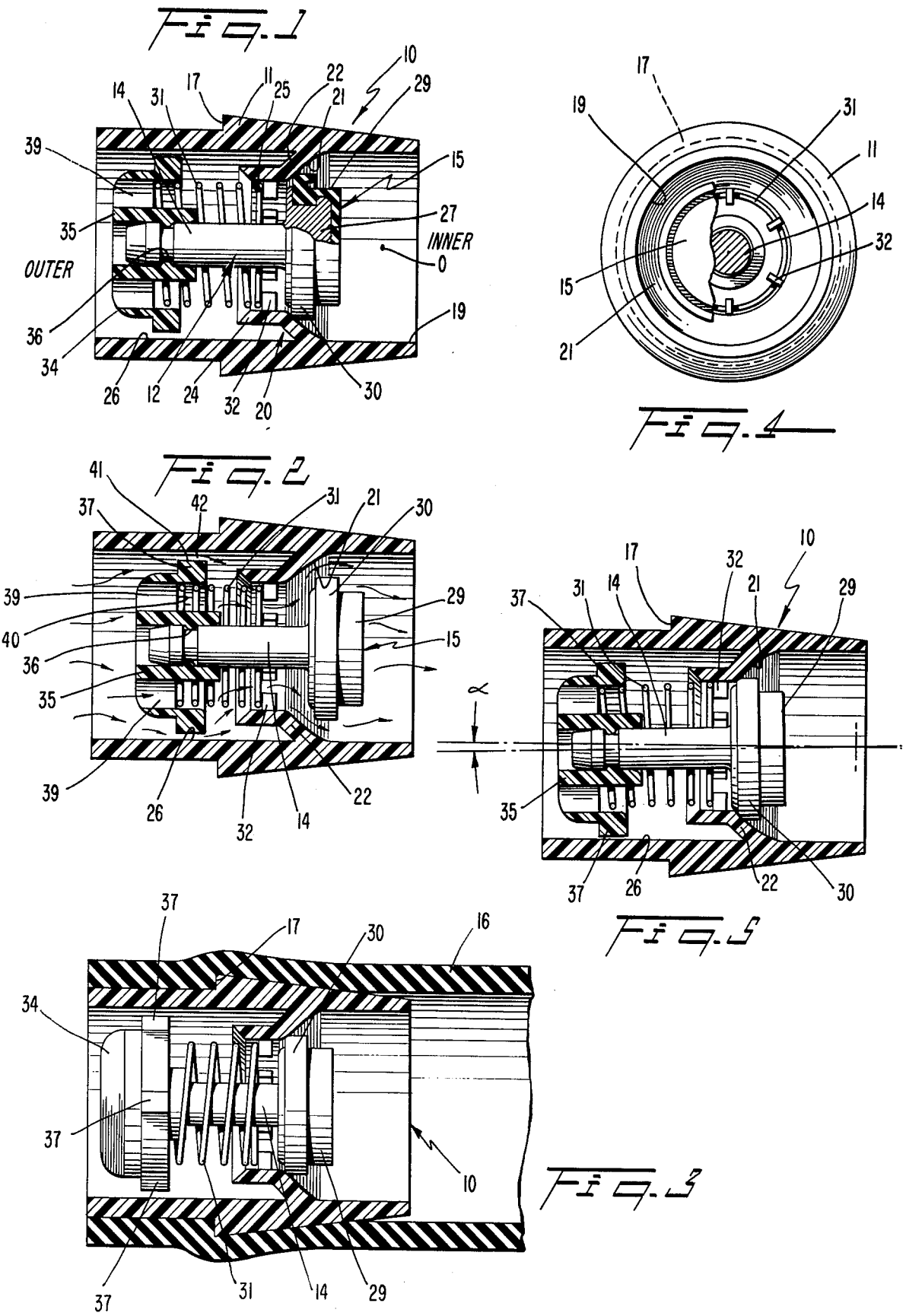

ORAL INFLATION VALVE

This application is a continuation of application Ser. No. 916,499, filed June 19, 1978, now abandoned.

This application is related to application Ser. No. 831,281, filed Sept. 7, 1977, by Glenn H. MACKAL, now U.S. Pat. No. 4,176,681, Dec. 4, 1979.

This invention relates to an improved check valve adapted for operation under light pressure, as in the oral inflation of inflatable articles.

The valve of the present invention incorporates a number of improvements over the oral inflation valve disclosed in U.S. Pat. No. 3,351,081, as well as that disclosed in the above referred to application Ser. No. 831,281. Both of such prior valves have a valve body with a longitudinal passage therethrough, there being a reciprocable valve element in said passage in the body, the valve element carrying an annular sealing member cooperating with and selectively sealing an annular valve seat in the valve body which surrounds the passage therethrough. In such prior valves the valve element is urged toward valve-closed position by a light coil compression spring which is overcome by inwardly directed oral air pressure. In the valve disclosed in U.S. Pat. No. 3,351,081, the sealing means on the valve element is an O-ring which is mounted in an annular groove on an enlarged head on the valve element. The O-ring cooperates with a part-toroidal valve seat which surrounds the passage through the valve body.

In the valve disclosed in application Ser. No. 831,281, the sealing member on the enlarged head of the valve element, rather than being an after-applied O-ring mounted in an annular groove on such head, is a molded-in-place annular member having a main annular body in an annular groove on the head of the valve element, and a sheet-like disc which is integral with the main part of the sealing member and overlies the axially inner end of the head on the valve element. In the valve disclosed in the above referred to application the sealing member has a flange which first extends generally radially outwardly of an annular root at the axially outer end of the main part of the sealing member and then turns axially inwardly to form an annular portion of the flange which, in relaxed condition, lies generally coaxial of and radially spaced from the annular body of the main part of the sealing member. The valve sealing member described in this paragraph is incorporated in the preferred embodiment of the valve of the present invention disclosed herein.

In the above referred to prior valves the valve seat is disposed on a radially inwardly projecting annular flange within the valve body, the valve disclosed in application Ser. No. 831,281, having a frusto-conical seat converging in an outwardly direction. The axially outer surface of such flange also functions as the seat for the axially inner end of the coil compression spring. In such prior valves the flange functioning as both a valve seat and a spring seat projects a substantial distance radially inwardly into the passage through the valve body, thereby markedly restricting the flow of fluid through the valve.

Also, in the above referred to prior valves, the forward or outer end of the forwardly projecting stem of the valve element is guided in the forward end of the passage through the valve body by a member which also functions as a valve-opening button, such member having a plurality of angularly spaced wings radiating from the axis thereof, the outer ends of such wings being joined by a rearwardly projecting sleeve which encompasses a large part of the forward portion of the spring, the axially inner or rear surfaces of the wings functioning as the forward seat for the spring. The outer diameter of the wings and the sleeve connected thereto is only slightly less than the diameter of the passage through the valve body so that the valve element is guided against appreciable tipping with respect to the axis of the valve body as the valve element reciprocates between valve-closed and valve-open positions. Such construction, taken with the fact that the valve body and valve element are rather long, prevent the valve element from any appreciable tipping relative to the valve body, and thus force the valve element to find a valve-sealing position by essentially purely reciprocal motion.

Finally, when the body of the prior valves was made of plastic material, radially inwardly directed pressure upon the valve body tended to distort the valve seat therein, and thus to cause leakage through the valve when the valve element was in its forward, valve-closed position.

The valve of the invention overcomes or at least minimizes the above described disadvantages of the prior art valves. In accordance with the present invention the valve body and valve element therein are made substantially shorter than those in the above referred to prior art valves. The path of fluid flow through the valve is markedly larger than that of the prior art valves, and thus permits the use of a lighter coil compression spring with consequent less back pressure imposed by the valve. The valve seat within the valve body is part-spherical, and the valve member is disposed and guided within the valve body so as to permit appreciable tipping of the valve element with respect to the valve body. As a result, the valve element can find any one of a large number of valve-sealing positions, since it is not confined to substantially reciprocal motion in its movement between valve-closed and valve-open positions. The axially inner spring seat is formed by a plurality of circumferentially thin angularly spaced radially inwardly projecting fingers, the spaces between the fingers forming a part of the total area of fluid passage through the valve. The valve operating button, affixed to the forward end of the stem of the valve element is axially short, and has only a short spring-confining axially rearwardly extending ring connected to the outer ends of the wings thereof. Consequently such guide permits a much freer passage of fluids there past than in the prior valves. Finally, the valve seat on the valve body is partially isolated from the wall of the valve body proper, thereby minimizing the valve seat-distorting effect of radially inwardly directed forces applied to the valve body in the vicinity of the valve seat.

The valve of the invention will be more readily understood upon reference to the accompanying drawings, in which:

FIG. 1 is a view in vertical axial section showing an illustrative embodiment of the valve of the invention, certain of the parts being shown in elevation, the valve element being shown in its valve-closed position;

FIG. 2 is a view similar to FIG. 1 but with the valve element being shown in a valve-open position;

FIG. 3 is a fragmentary view showing the valve in combination with a fragmentarily-illustrated inflation tube in which it is mounted, the valve being shown in the manner somewhat similar to that of FIG. 1 but with the valve element thrust into a valve-closed position in which it lies somewhat further axially outwardly than in FIG. 1 as a result of its subjection to the pressure of fluid within the inflating tube;

FIG. 4 is a view in end elevation of the valve, the view being taken in the direction from right to left in FIG. 1; and FIG. 5 is a view similar to FIG. 1 but showing the valve element in a valve-closed position even though the valve element is tipped somewhat with respect to the valve body.

Turning now to the drawings, the illustrative embodiment of the valve of the invention is generally designated by the reference character 10. Valve 10 has a generally circular cylindrical body 11 which in FIG. 3 is shown as being inserted within an inflating tube 16 which leads to an inflatable article (not shown) such as a life vest. The outer end of the tube 16 and the valve 10 inserted therein form a mouth piece for the oral inflation of the inflatable article. Disposed within the valve body 11 is a valve element 12 which can both reciprocate and tip somewhat relative to the valve body 11. The valve element 12 has a central valve stem 14 having a disc-like head 15 disposed coaxially thereof on its rear or inner end.

The valve body 11 has a central passage therethrough made up of a rear circular cylindrical portion 19, an outwardly or forwardly converging valve seat 21 forwardly of portion 19, and a forward or outer circular cylindrical passage portion 26, all of portions 19, 21 and 26 being coaxial of each other and of the valve body. The valve seat 21 is part-spherical in shape, the imaginary sphere upon which it is disposed having a center O as shown in FIG. 1. The valve seat 21 merges at its rear with the passage portion 19 and extends forwardly to form the rear surface of an annular flange 22 having generally parallel axially inner and outer axially, outwardly converging surfaces, flange 22 being integral with the body 10 and has a rear portion extending from the inner surface of the valve body to converge in a forwardly direction. Forwardly of such converging portion, the flange 22 has a circular cylindrical sleeve portion 24 which is coaxial of the valve seat 21 and of the valve body. The portion 24 of the flange presents a passage 25 therethrough which is unrestricted except for a plurality of circumferentially thin angularly spaced radially inwardly projecting fingers 32, to be more fully described hereinafter.

The head 15 on the valve element 12 is made up of a disc-like part 27, integral with the stem 14, and a rubber or rubber-like annular sealing member 29 which is the same as the sealing member 35 in the valve disclosed in application Ser. No. 831,281. Sealing member 29 has a rearwardly extending annular flange portion 30 the annular forward or outer edge of which engages the seat 21 when the valve element 12 is in a valve-closing position toward which it is constantly urged by a coil compression spring 31 which is telescoped about the stem 14. As shown in FIGS. 1,3 and 5, the annular zone of engagement between the flange 30 of the sealing member 29 lies substantially axially outwardly (to the left) of the annular junction between the axially inner surface of the flange 22 and the wall of the passage 19 through the valve body, and substantially in the transverse plane containing the annular junction between the axially outer surface of the flange 22 and the wall of the passage 19 through the valve body. Also, as shown in the drawings, there is a free annular space of substantial radial width between the axially outer convex surface of the flange 22 and the wall of the passage 19 through the valve body. The rear end of spring 31 is held in a rear spring seat 19 formed by the forward end 24 of the flange 20, and by the plurality of radially inwardly extending fingers 32 integral therewith. The forward seat for the spring 31 is provided by an operating button 34, now to be described, affixed to the forward or outer end of the stem 14 of the valve element 11.

The button or guide 34 has a central hub 35 which is telescoped over the forward or outer end of the stem 14 of the valve element and is retained thereon by a snap-on connection, as shown. Projecting radially from the hub 34 are a plurality of circumferentially narrow wings 37 (four such wings being employed in the illustrative embodiment). The wings 37 have roots 39 the rear or inner edges of roots 39 forming the outer or forward seat for the spring 31. The radially outer ends 41 at their axially inner ends are connected by an axially narrow ring 41, the ring 41 having such radial height that when the valve element 12 is positioned coaxial of the valve body 11, as shown in FIGS. 1 and 2, there are presented spaces 42 of appreciable radial dimension between the radially outer end surface of ring 41 and the surface of the part 26 of the passage in the valve body. As shown in FIG. 5, this permits the valve element 12 to tip appreciably with respect to the valve body 11 without interfering with the reciprocation of the valve element between its valve-closed and valve-open positions, and thus permits the valve element freely to find any one of a number of valve-closed positions in which complete sealing is attained between the sealing member 29 and the valve seat 21. In a non-limiting, illustrative embodiment of the axis of the valve element 12 is permitted to tip through an angle α which equals approximately 2° in any direction from the axis of the valve body 11.

Also, in a non-limiting illustrative embodiment the valve stem 14 and the head portion 27 of the valve element, is nickel plated brass, the valve body 11 and the guard and operating button 34 are made of "Delrin" (acetal resin), the coil compression spring 31 is made of stainless steel, and the sealing member 29 is made of Buna N synthetic rubber having a 40+ −5 durometer rating within the temperature range of −65° to 212° F.

Although the invention has been illustrated and described with reference to a single preferred embodiment thereof, it is to be expressly understood that it is in no way limited to the disclosure of such a single embodiment, but is capable of numerous modifications within the scope of the appended claims.

What is claimed is:

1. A check valve adapted for oral inflation use, comprising a generally cylindrical elongated body, the body having axially inner and outer ends and being made of plastic material, the body being in the form of a sleeve having an axial passage including a main cylindrical bore therethrough, an annular axially outwardly converging valve seat within the body coaxial thereof, an elongated valve element within the body having a stem extending through the valve seat and a head thereof spanning the valve seat and disposed axially inwardly thereof, the head having an annular sealing portion adapted sealingly to engage the surface of the valve seat, said annular sealing portion being aligned between spaced parallel planes transverse to the length of the valve element, means constantly urging the valve element towards is axially outward, valve-closed position, the valve seat being disposed upon an axially outwardly converging annular flange disposed within and integral with the valve body, the flange having an axially inner concave surface and an axially outer, convex surface, said two surfaces being generally parallel, said annular flange extending radially inwardly from the main cylindrical bore through the valve body, the valve seat being disposed on the concave, axially inner side of the flange, the portion of the valve seat engaged by the head of the valve element in valve-closed position being spaced substantially radially inwardly from the junction between the flange and the wall of the main, cylindrical bore in the valve body and substantially axially outwardly of the annular junction between the axially inner, concave surface of the flange and the wall of the passage through the body, there being a free annular space of substantial radial width between the axially outer convex surface of the flange and the bore of the valve body, whereby at least partially to isolate the valve seat from distortion of the valve body by radially inwardly directed forces applied applied to the valve body.

2. The valve according to claim 1, wherein the surface of the valve seat is in the form of a part of a sphere the center of which lies on the longitudinal axis of the valve body.

3. The valve according to claim 2, comprising means for loosely guiding the valve element with respect to the valve body whereby the axis of the valve element may tip appreciably with respect to the axis of the valve body while preserving a seal between head of the valve element and the valve seat on the parts are in valve-closed position.

* * * * *